(12) United States Patent
Takizawa

(10) Patent No.: US 12,493,517 B2
(45) Date of Patent: Dec. 9, 2025

(54) SEMICONDUCTOR MEMORY DEVICE

(71) Applicants: DENSO CORPORATION, Kariya (JP); TOYOTA JIDOSHA KABUSHIKI KAISHA, Toyota (JP); MIRISE Technologies Corporation, Nisshin (JP)

(72) Inventor: Tetsuro Takizawa, Nisshin (JP)

(73) Assignees: DENSO CORPORATION, Kariya (JP); TOYOTA JIDOSHA KABUSHIKI KAISHA, Toyota (JP); MIRISE Technologies Corporation, Nisshin (JP)

( * ) Notice: Subject to any disclaimer, the term of this patent is extended or adjusted under 35 U.S.C. 154(b) by 0 days.

(21) Appl. No.: 18/417,093

(22) Filed: Jan. 19, 2024

(65) Prior Publication Data

US 2024/0296091 A1    Sep. 5, 2024

(30) Foreign Application Priority Data

Mar. 2, 2023    (JP) ................. 2023-031937

(51) Int. Cl.
*G06F 11/00* (2006.01)
*G06F 11/10* (2006.01)
*G06F 12/0806* (2016.01)

(52) U.S. Cl.
CPC ...... *G06F 11/1044* (2013.01); *G06F 12/0806* (2013.01); *G06F 2212/1032* (2013.01)

(58) Field of Classification Search
CPC ............ G06F 11/1044; G06F 11/1048; G06F 11/1012; G06F 11/1064
See application file for complete search history.

(56) References Cited

U.S. PATENT DOCUMENTS

| | | | |
|---|---|---|---|
| 2016/0315639 A1* | 10/2016 | Shang | G06F 9/38 |
| 2021/0064282 A1* | 3/2021 | He | G11C 7/1009 |
| 2021/0294533 A1* | 9/2021 | He | G11C 7/1069 |
| 2022/0245031 A1 | 8/2022 | Nakanishi et al. | |
| 2024/0296091 A1* | 9/2024 | Takizawa | G06F 11/1048 |

* cited by examiner

*Primary Examiner* — Amine Riad
(74) *Attorney, Agent, or Firm* — Posz Law Group, PLC

(57) ABSTRACT

A semiconductor memory device includes a plurality of banks, a sense amplifier, an ECC code generation unit, an error correction unit, a first bus, and a second bus. The banks include a data recording unit in which rewritten data is to be written, and an ECC code recording unit in which an error correction code corresponding to the rewritten data is to be written. The sense amplifier is included in each of the banks and configured to read and write data from and to each of the banks. The ECC code generation unit generates the error correction code. The error correction unit corrects an error of data using the error correction code. The first bus connects the sense amplifier in each of the banks and the error correction unit. The second bus connects the ECC code generation unit and the sense amplifier in each of the banks.

7 Claims, 8 Drawing Sheets

SEMICONDUCTOR MEMORY DEVICE

CROSS REFERENCE TO RELATED APPLICATION

The present application claims the benefit of priority from Japanese Patent Application No. 2023-031937 filed on Mar. 2, 2023. The entire disclosure of the above application is incorporated herein by reference.

TECHNICAL FIELD

The present disclosure relates to a semiconductor memory device.

BACKGROUND

As a semiconductor memory device, a dynamic random access memory (DRAM) having an error check and correct (ECC) function and autonomously performing data error correction process has been known.

SUMMARY

The present disclosure provides a semiconductor memory device including a plurality of banks, a sense amplifier, an ECC code generation unit, an error correction unit, a first bus, and a second bus. The banks include a data recording unit in which rewritten data is to be written, and an ECC code recording unit in which an error correction code corresponding to the rewritten data is to be written. The sense amplifier is disposed in each of the banks and is configured to read and write data from and to each of the banks. The ECC code generation unit generates the error correction code. The error correction unit corrects an error of data using the error correction code. The first bus connects the sense amplifier in each of the banks and the error correction unit. The second bus connects the ECC code generation unit and the sense amplifier in each of the banks.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
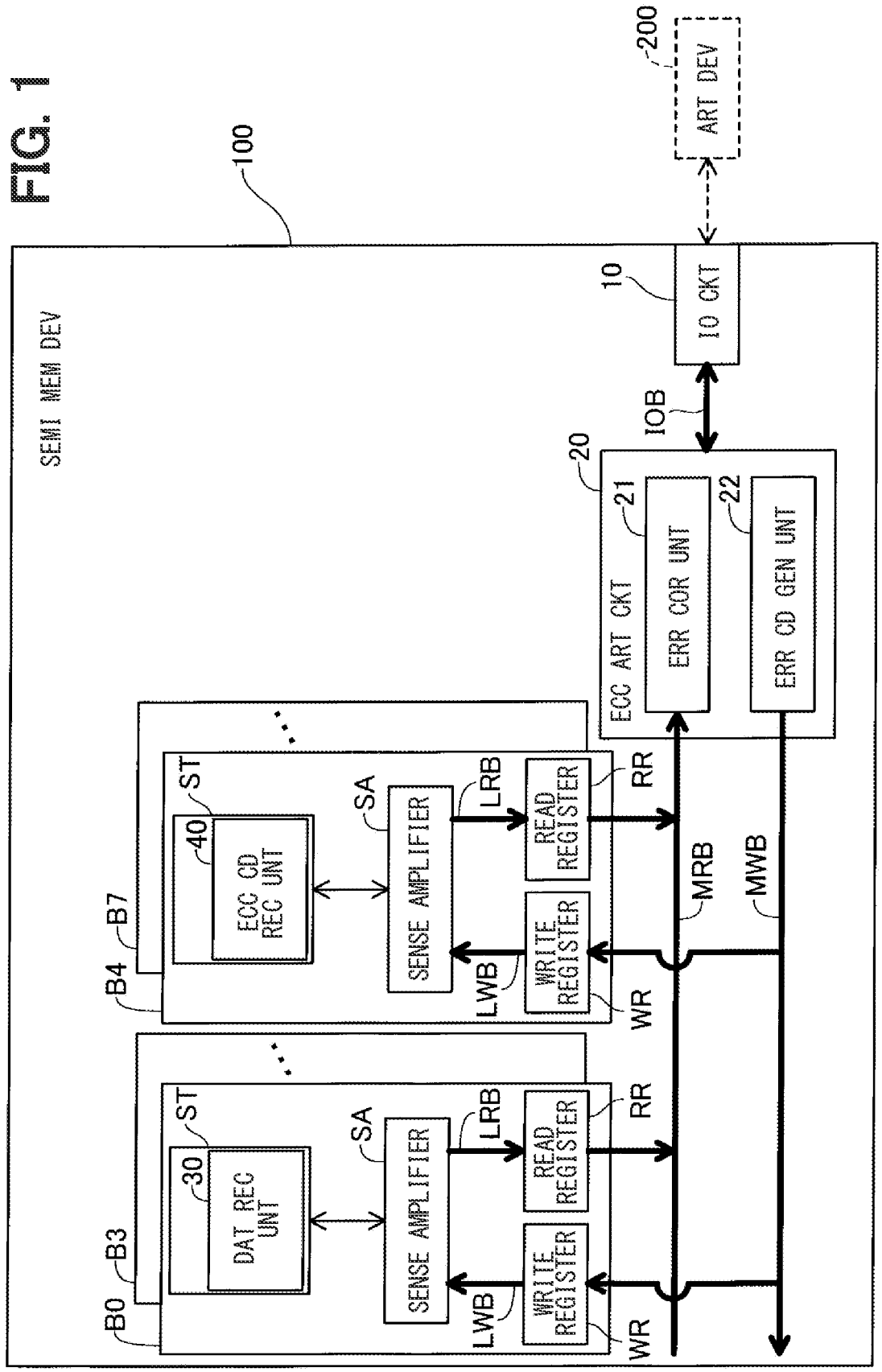
FIG. 1 is an explanatory diagram showing a schematic configuration of a semiconductor memory device according to a first embodiment.

Next, a relevant technology is described only for understanding the following embodiments. A semiconductor memory device according to the relevant technology includes a DRAM having an ECC function, and can perform a mask write process of rewriting only a part of data when writing the data. In the semiconductor memory device described above, a plurality of mask write processes in which banks to which data is to be written are different from each other is pipelined, thereby restricting a deterioration in data processing performance.

However, when a plurality of mask write processes in which the banks to be accessed are the same as each other are continuously executed, the next mask write process cannot be executed until the previous series of processes are completed, and the data processing performance deteriorates.

A semiconductor memory device according to an aspect of the present disclosure is configured to execute a mask write process for rewriting data having a data length smaller than a preset data access unit, and includes a plurality of banks, a sense amplifier, an ECC code generation unit, an error correction unit, a first bus, and a second bus. The plurality of banks include a data recording unit in which rewritten data is to be written, and an ECC code recording unit in which an error correction code corresponding to the rewritten data is to be written. The sense amplifier is disposed in each of the plurality of banks and is configured to read and write data from and to each of the plurality of banks. The ECC code generation unit is configured to generate the error correction code. The error correction unit is configured to correct an error of data using the error correction code. The first bus connects the sense amplifier in each of the plurality of banks and the error correction unit and is configured to transmit data output from the sense amplifier to the error correction unit. The second bus connects the ECC code generation unit and the sense amplifier in each of the plurality of banks and is configured to transmit data output from the ECC code generation unit to the sense amplifier.

According to the semiconductor memory device of this aspect, since the first bus and the second bus are provided, the output of data from the sense amplifier to the error correction unit and the input of data from the ECC code generation unit to the sense amplifier can be executed in parallel in the same bank. Therefore, even when a plurality of mask write processes in which the banks to which data is to be written are the same are continuously executed, if the columns to be accessed are different from each other, the next mask write process can be executed in parallel without waiting for the end of the previous mask write process, and a deterioration in data processing performance can be restricted.

First Embodiment

A semiconductor memory device 100 according to a first embodiment of the present disclosure reads and writes data in response to a request received from an arithmetic device 200 such as a central processing unit (CPU) or a graphics processing unit (GPU). In the present embodiment, the semiconductor memory device 100 is configured as a low power double-data-rate 4 (LPDDR4), and is configured to be able to perform a mask write process in addition to a write process of performing normal data writing. The "mask write process" is a process of rewriting a part of data read in a data access unit preset as a specification of the semiconductor memory device 100 with newly input data having a data length smaller than the access unit and rewriting the data again. In the following description, a command issued from the arithmetic device 200 and requesting the mask write process is also referred to as a "mask write command".

In the following description, data having a data length smaller than the data access unit is also referred to as "mask data". In addition, data in which a part of the data is rewritten by the mask data is also referred to as "rewriting target data", and a bit string in the rewriting target data rewritten by the mask data is also referred to as a "rewriting target part". In the present embodiment, the mask data includes address information indicating an address of a storage area in which the rewriting target data is held, and information indicating which bit string of the rewriting target data is set as a rewriting target part.

As shown in FIG. 1, the semiconductor memory device (SEMI MEM DEV) 100 of the present embodiment includes an input and output circuit (IO CKT) 10, an input and output bus IOB, a plurality of banks B0 to B7, an ECC arithmetic circuit (ECC ART CKT) 20, a main read bus MRB, and a main write bus MWB. The semiconductor memory device 100 includes a clock generation circuit, various decoders, and the like in addition to the above-described configuration. However, since the configurations of these components are similar to those of the general LPDDR4, the illustration of these components is omitted in FIG. 1.

The input and output circuit 10 controls input from and output to the arithmetic device (ART DEV) 200. More specifically, the input and output circuit 10 inputs and outputs data in accordance with a clock signal supplied from the outside of the semiconductor memory device 100 or a clock signal generated by a clock generation circuit (not shown) included in the semiconductor memory device 100. In the present embodiment, the input and output circuit 10 has a data bus inversion (DBI) function. When a data input from the arithmetic device 200 is bit-inverted, the input and output circuit 10 restores the original data by bit-inverting the data again. In this way, by executing the DBI process by the DBI function when transmitting data including many "0"s whose power consumption is larger than that of "1"s, the power consumption at the time of data transmission can be restricted. The semiconductor memory device 100 may also be configured not to have the DBI function.

Each of the banks B0 to B7 includes a storage area ST, a sense amplifier SA, a read register RR, a write register WR, a local read bus LRB, and a local write bus LWB. The storage area ST is formed by arranging memory cells, which are memory elements, in a matrix. Among the banks B0 to B7, the storage area ST included in each of the banks B0 to B3 functions as a data recording unit (DAT REC UNT) 30 that holds write data written from the arithmetic device 200. Among the banks B0 to B7, the storage area ST included in each of the banks B4 to B7 function as an ECC code recording unit (ECC CD REC UNT) 40 that holds an ECC code generated by an ECC code generation unit 22 to be described later corresponding to data to be written to the data recording unit 30.

The sense amplifier SA is connected to the storage area ST to read data from the storage area ST and write data to the storage area ST. More specifically, when data is read from the storage area ST in accordance with a command issued from the arithmetic device 200, the sense amplifier SA reads data held in a memory cell designated by a row address selected by a row decoder (not shown) in accordance with an address designated by a received active command. On the other hand, when data is written to the storage area ST in accordance with a command issued from the arithmetic device 200, the sense amplifier SA writes data held in a memory cell designated by a row address designated when an active command is issued, in accordance with a received precharge command.

The read register RR is connected to the sense amplifier SA via the local read bus LRB, and is connected to the ECC arithmetic circuit 20 via the main read bus MRB. When data is output from the sense amplifier SA to the outside of the bank, the read register RR temporarily holds the data output from the sense amplifier SA via the local read bus LRB, and outputs the data to the ECC arithmetic circuit 20 via the main read bus MRB.

The write register WR is connected to the sense amplifier SA via the local write bus LWB, and is connected to the ECC arithmetic circuit 20 via the main write bus MWB. When data is input to the sense amplifier SA from outside the bank, the write register WR temporarily holds the data input from the ECC arithmetic circuit 20 via the main write bus MWB, and inputs the data to the sense amplifier SA via the local write bus LWB. Data output from the sense amplifier SA to the read register RR via the local read bus LRB and data input from the write register WR to the sense amplifier SA via the local write bus LWB can be executed in parallel with each other.

The ECC arithmetic circuit 20 is connected to the input and output circuit 10 via the input and output bus IOB. The ECC arithmetic circuit 20 includes an error correction unit (ERR COR UNT) 21 and an ECC code generation unit (ECC CD GEN UNT) 22. Each of the error correction unit 21 and the ECC code generation unit 22 may be implemented by one or more hardware logic circuits, for example.

The error correction unit 21 is connected to the read register RR included in each of the banks via the main read bus MRB. As described above, in the semiconductor memory device 100, the local read bus LRB of each of the banks, the read register RR of each of the banks, and the main read bus MRB form a data transmission path that connects the sense amplifier SA and the error correction unit 21 to each other. In the following description, this data transmission path is also referred to as a "first bus". When reading data from the data recording unit 30, the error correction unit 21 also reads an ECC code corresponding to the read data from the ECC code recording unit 40. If an error occurs in the read data, the error correction unit 21 corrects the error using the ECC code. The error correction unit 21 selects a bank from which the read data is to be read and a bank from which the ECC code is to be read in accordance with the bank address designated by the received mask write command.

The ECC code generation unit 22 is connected to the write register WR included in each of the banks via the main write bus MWB. As described above, in the semiconductor memory device 100, the local write bus LWB of each of the banks, the write register WR of each of the banks, and the main write bus MWB form a data transmission path that connects the sense amplifier SA and the ECC code generation unit 22 to each other. In the following description, this data transmission path is also referred to as a "second bus". The ECC code generation unit 22 generates an error correction code (ECC code) corresponding to written data when writing data to the data recording unit 30. The ECC code generation unit 22 selects a bank to which the written data is to be written and a bank to which the ECC code is to be written in accordance with the bank address designated by the received mask write command.

In the above-described mask write process, the ECC code generation unit 22 receives the rewriting target data and the mask data, and rewrites the rewriting target part of the rewriting target data with the mask data. In the present embodiment, this process is performed by inputting the rewriting target data and the mask data to a multiplexer (not shown) included in the ECC code generation unit 22.

Figure 2:
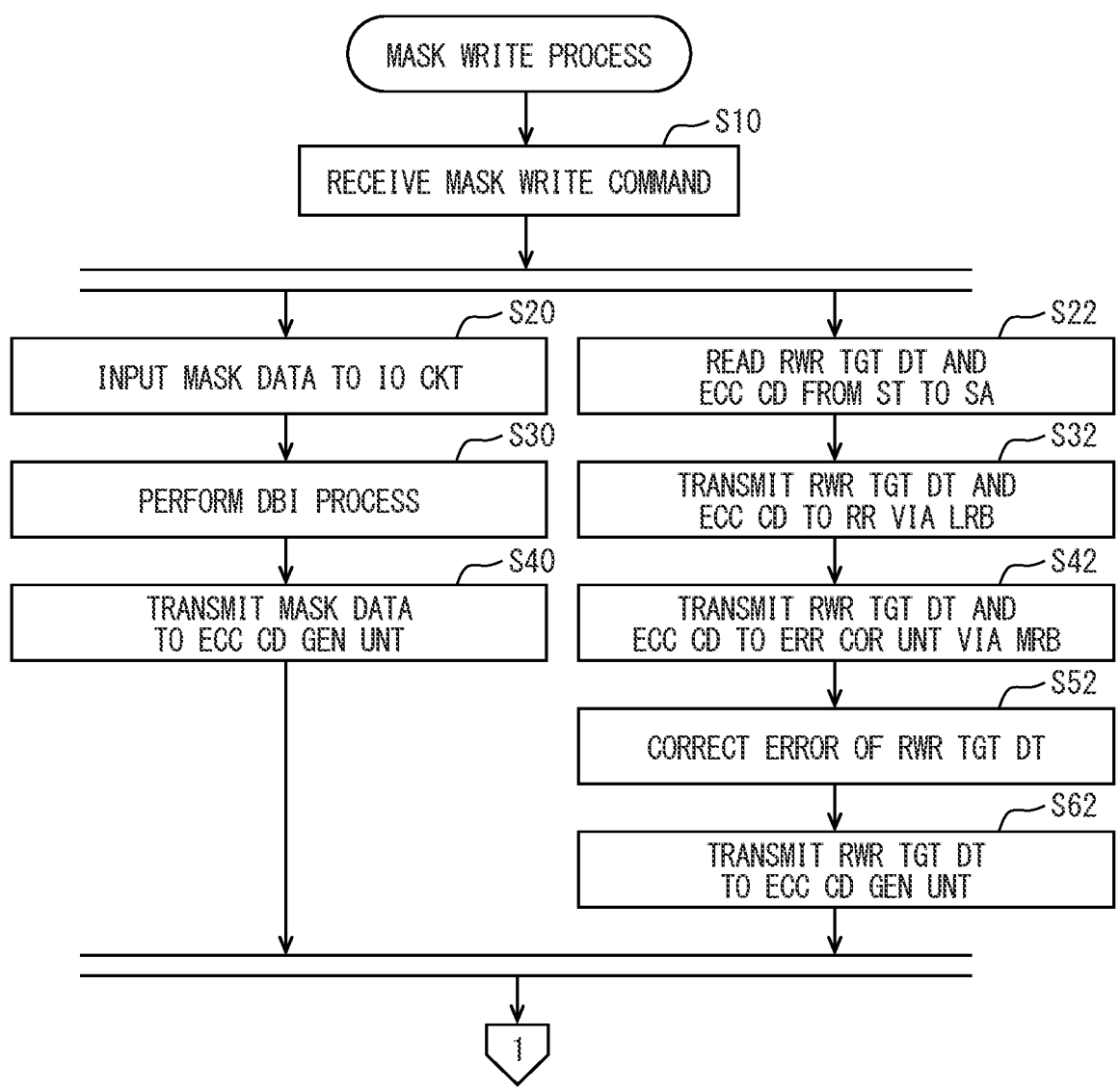
FIG. 2 is a flowchart showing a procedure of a mask write process according to the first embodiment.
Figure 3:
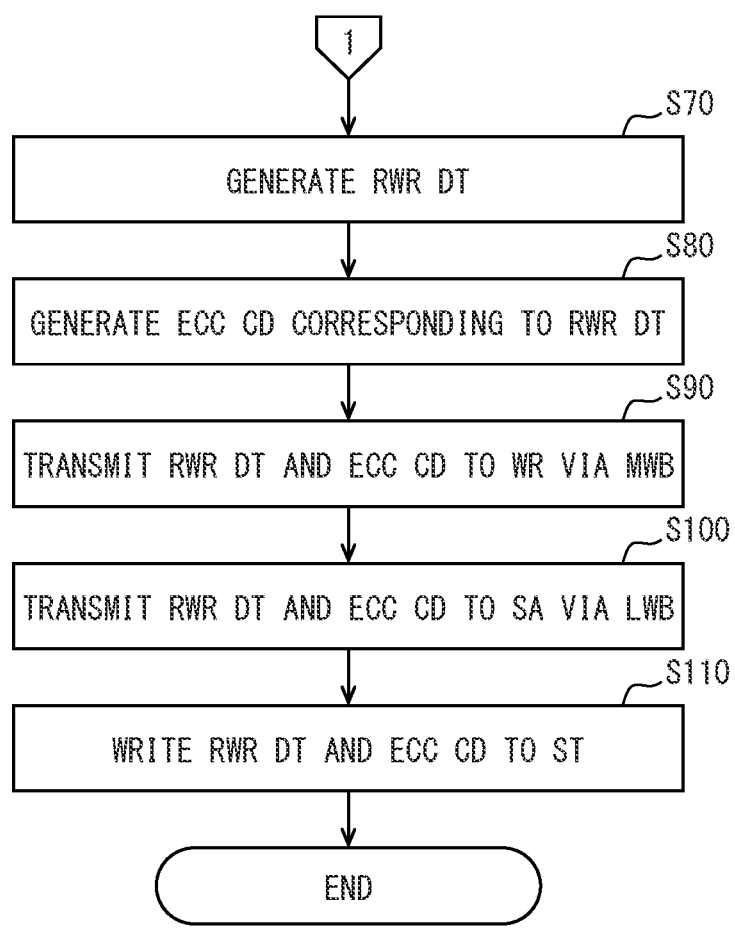
FIG. 3 is a flowchart showing a procedure of the mask write process according to the first embodiment.

When the mask write command is issued from the arithmetic device 200, the semiconductor memory device 100 executes the mask write process shown in FIG. 2 and FIG. 3. In the present embodiment, when the banks to be accessed are different from each other, or when the banks to be accessed are the same and columns to be accessed are different from each other, the semiconductor memory device 100 can execute a plurality of mask write processes in parallel.

In S10 illustrated in FIG. 2, the semiconductor memory device 100 receives the mask write command from the arithmetic device 200. Thereafter, as illustrated in FIG. 2, the semiconductor memory device 100 executes the processes of S20, S30, and S40 and the processes of S22, S32, S42, S52, and S62 in parallel.

In S20, the semiconductor memory device 100 instructs the input and output circuit 10 to receive the mask data from the arithmetic device 200.

In S30, the semiconductor memory device 100 instructs the input and output circuit 100 to perform the DBI process on the mask data.

In S40, the semiconductor memory device 100 instructs the input and output circuit 10 to transmit the mask data to the ECC code generation unit 22.

In S22, the semiconductor memory device 100 reads the rewriting target data (RWR TGT DT) and the ECC code (ECC CD) corresponding to the rewriting target data from the storage area ST to the sense amplifier SA. More specifically, the semiconductor memory device 100 reads the rewriting target data from the data recording unit 30 included in the bank designated by the mask write command among the banks B0 to B3 and writes the rewriting target data to the sense amplifier SA connected to the data recording unit 30. The semiconductor memory device 100 reads the ECC code from the ECC code recording unit 40 included in one of the banks B4 to B7 and holding the ECC code generated corresponding to the rewriting target data and writes the ECC code to the sense amplifier SA connected to the ECC code recording unit 40. Since the bank in which the rewriting target data is held and the bank in which the ECC code is held are different from each other, the above-described processes are executed independently in each of the banks.

In S32, the semiconductor memory device 100 transmits the rewriting target data and the ECC code from the sense amplifier SA to the read register RR via the local read bus LRB. Similarly to S22 described above, this process is executed independently in each of the banks.

In S42, the semiconductor memory device 100 transmits the rewriting target data and the ECC code from the read register RR to the error correction unit 21 via the main read bus MRB.

In S52, the semiconductor memory device 100 instructs the error correction unit 21 to perform error correction on the rewriting target data using the ECC code.

In S62, the semiconductor memory device 100 transmits the rewriting target data from the error correction unit 21 to the ECC code generation unit 22.

After the completion of S40 and S62, in S70 shown in FIG. 3, the semiconductor memory device 100 instructs the error correction unit 21 to generate rewritten data (RWR DT) by replacing the rewriting target part of the rewriting target data with the mask data.

In S80, the semiconductor memory device 100 instructs the ECC code generation unit 2 to generate an ECC code corresponding to the rewritten data.

In S90, the semiconductor memory device 100 transmits the rewritten data and the ECC code from the ECC code generation unit 22 to the write register WR via the main write bus MWB.

In S100, the semiconductor memory device 100 transmits the rewritten data and the ECC code from the write register WR to the sense amplifier SA via the local write bus LWB.

In S110, the semiconductor memory device 100 writes the rewritten data and the ECC code from the sense amplifier SA to the storage area ST. Then, the semiconductor memory device 100 ends the mask write process.

Figure 4:
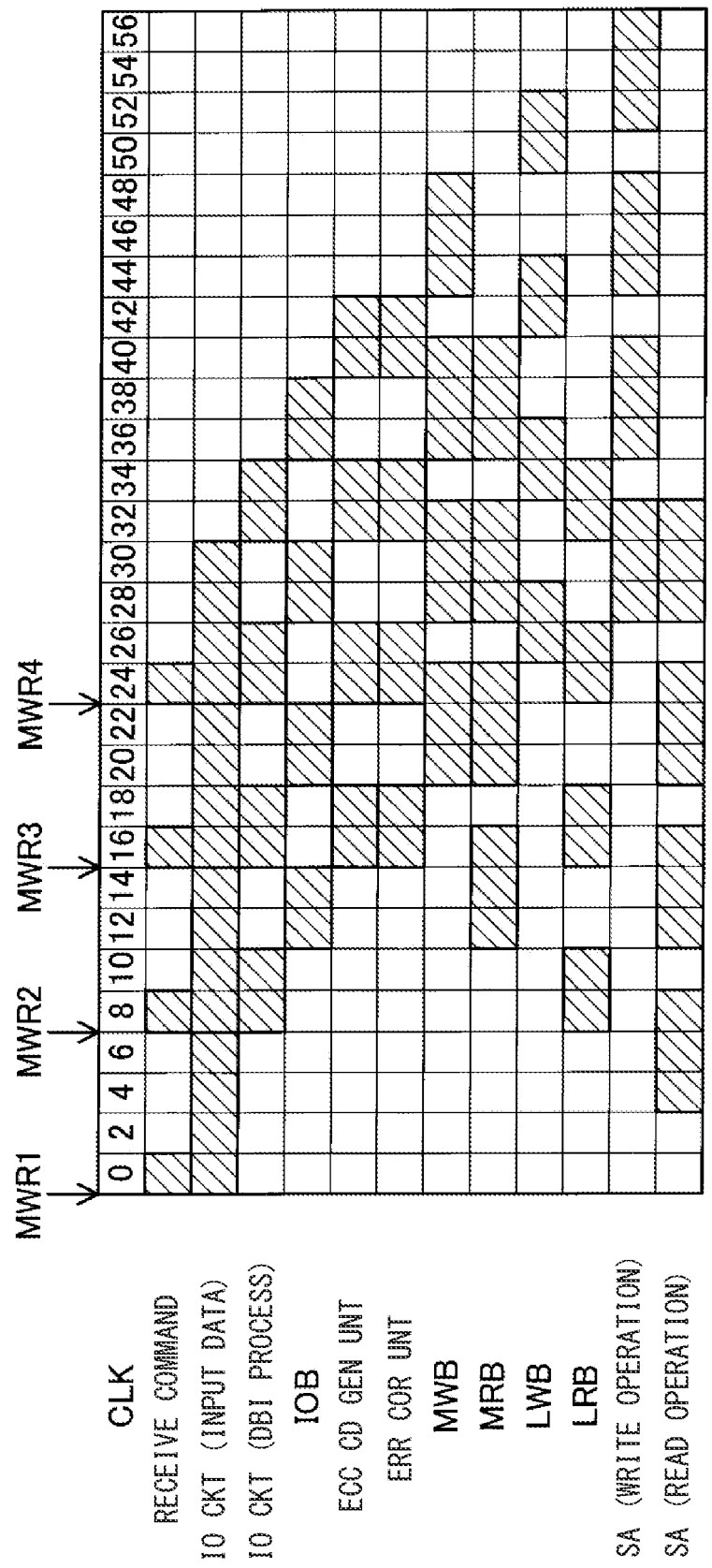
FIG. 4 is a timing diagram showing an example of the operation of the semiconductor memory device according to the first embodiment.

A more specific description will be given with reference to FIG. 4 showing an example of a timing diagram when a plurality of mask write processes is executed in parallel in the semiconductor memory device 100 of the present embodiment. In FIG. 4, the horizontal axis represents an elapsed time in terms of the number of clocks CLK, and a hatched rectangular region indicates that each element constituting the semiconductor memory device 100 represented by the vertical axis is used during a clock interval represented by the rectangular region.

FIG. 4 shows a case where the mask write commands MWR1 to MWR4 are received at clock numbers CLK0, CLK8, CLK16, and CLK24, respectively. In other words, the semiconductor memory device 100 may receive one mask write command for each cycle having the number of clocks of eight. The mask write commands MWR1 to MWR4 are commands for requesting the mask write process in which the banks to be accessed are the same and the columns to be accessed are different.

As described above, since the semiconductor memory device 100 of the present embodiment has the local read bus LRB and the local write bus LWB, data output from the sense amplifier SA to the read register RR via the local read bus LRB and data input from the write register WR to the sense amplifier SA via the local write bus LWB can be executed in parallel with each other. Therefore, the semiconductor memory device 100 can perform the write operation and the read operation in parallel in the sense amplifier SA even in the same bank as indicated by the clock numbers CLK28 to CLK32 in FIG. 4. In a case where the mask write command requests the mask write process for different banks, the sense amplifier SA for performing the write operation and the sense amplifier SA for performing the read operation are different from each other. Therefore, the write operation and the read operation in each of the sense amplifiers SA can be executed in parallel.

On the other hand, in a semiconductor memory device having a configuration in which one bus extending from a sense amplifier branches and is connected to each of a read register and a write register, while one of data output from the sense amplifier to the read register or data input from the write register to the sense amplifier is being executed, the other process cannot be executed in the same bank. Therefore, in the semiconductor memory device having such a configuration, it is necessary to receive the subsequent mask write command with a delay so that the write operation and the read operation in the sense amplifier are not performed in parallel, and thus the data processing performance at the time of executing the mask write process deteriorates. According to the semiconductor memory device 100 of the present embodiment, since such an issue can be avoided, it is possible to restrict deterioration in data processing performance when a plurality of mask write processes is executed.

According to the semiconductor memory device 100 of the first embodiment described above, since the first bus and the second bus are provided, the output of data from the sense amplifier SA to the error correction unit 21 and the input of data from the ECC code generation unit 22 to the sense amplifier SA can be executed in parallel in the same bank. Therefore, even when a plurality of mask write processes in which the banks to be accessed are the same are continuously executed, if the columns to be accessed are different from each other, the next mask write process can be executed in parallel without waiting for the end of the previous mask write process, and deterioration in data processing performance can be restricted.

Second Embodiment

Figure 5:
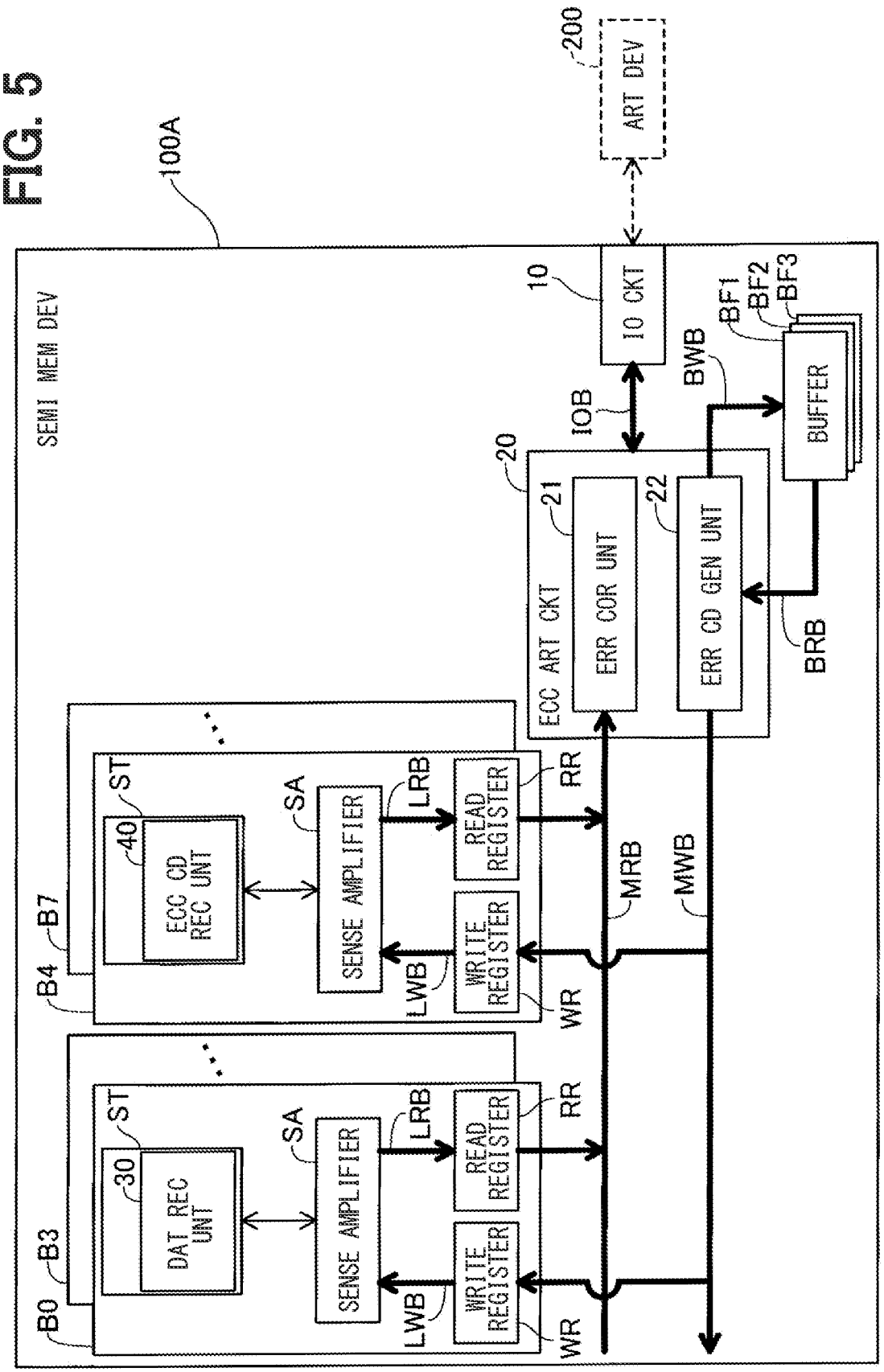
FIG. 5 is an explanatory diagram showing a schematic configuration of a semiconductor memory device according to a second embodiment.
Figure 6:
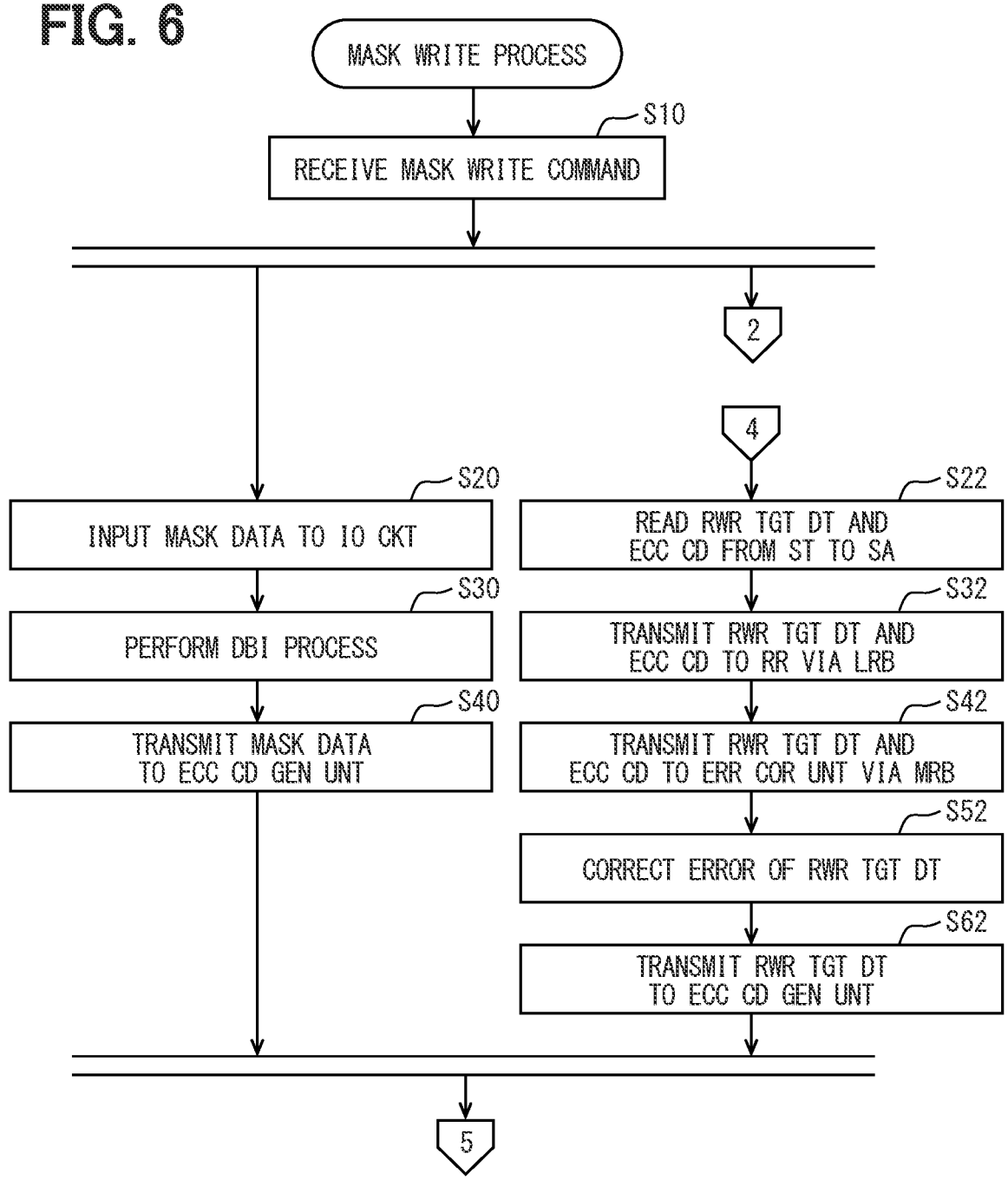
FIG. 6 is a flowchart showing a procedure of a mask write process according to the second embodiment.
Figure 7:
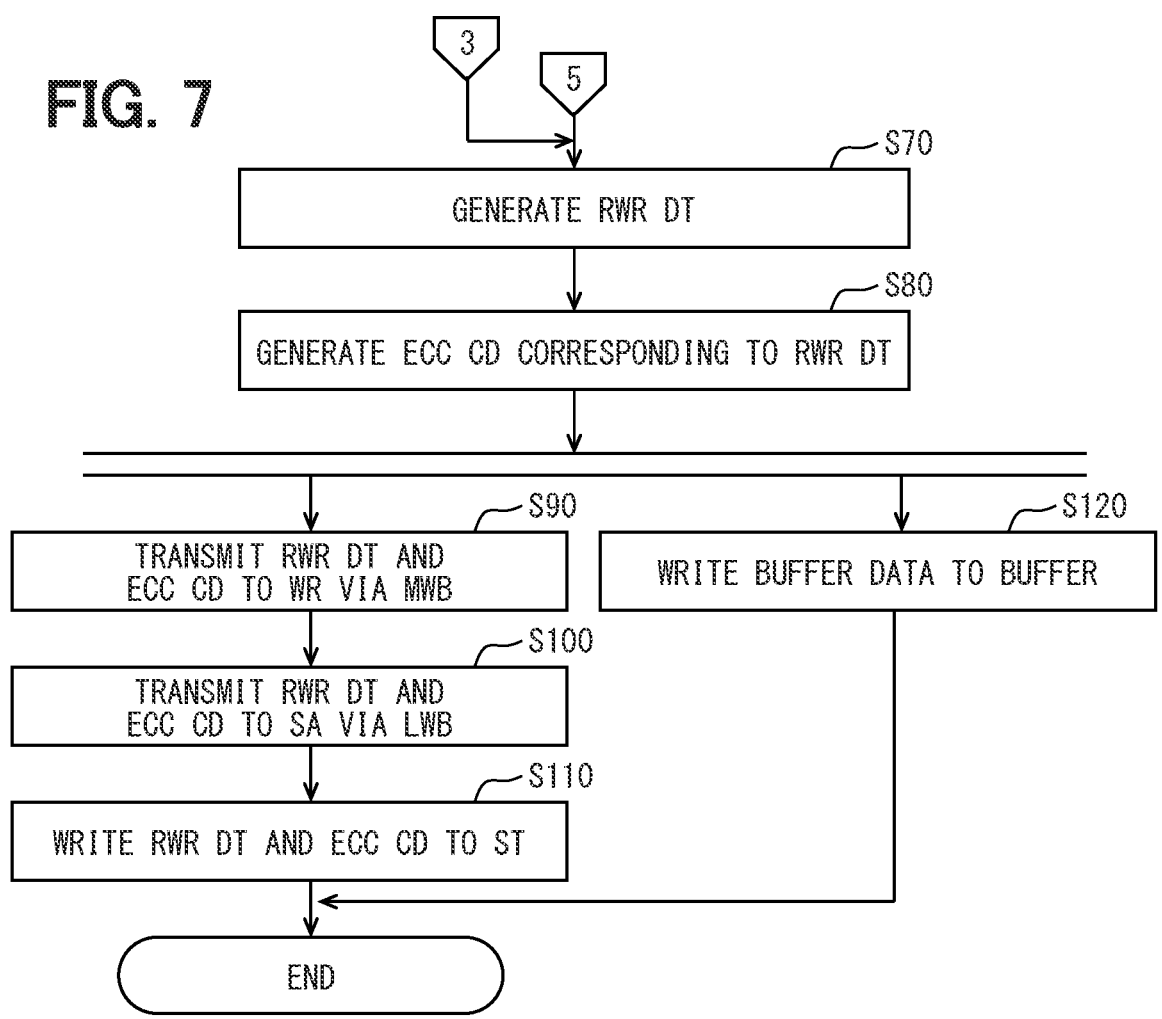
FIG. 7 is a flowchart showing a procedure of the mask write process according to the second embodiment.
Figure 8:
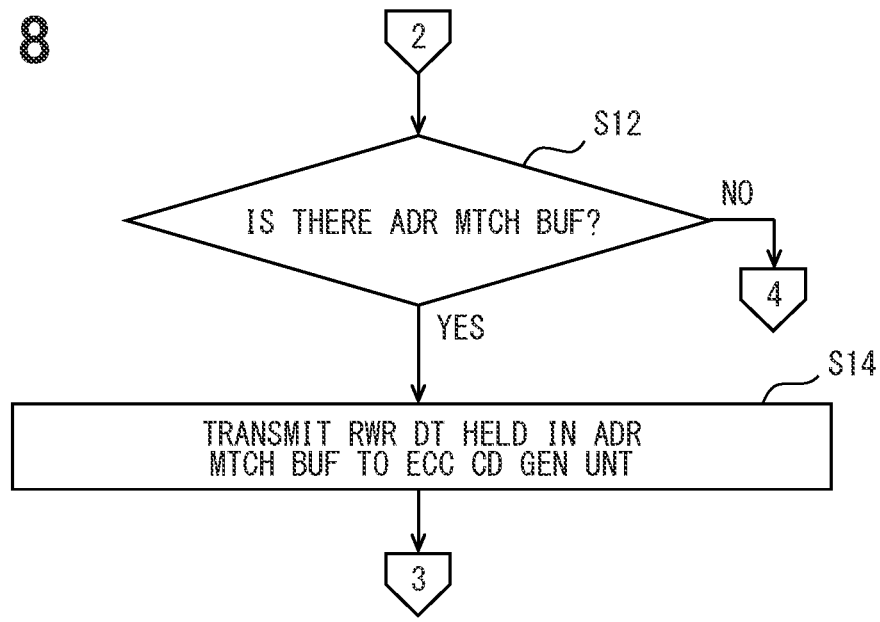
FIG. 8 is a flowchart showing a procedure of the mask write process according to the second embodiment.

As shown in FIG. 5, a semiconductor memory device 100A of a second embodiment is different from the semiconductor memory device 100 of the first embodiment in that buffers BF1 to BF3 are provided. The semiconductor memory device 100A of the second embodiment is different from the semiconductor memory device 100 of the first embodiment in that S12 and S14 shown in FIG. 8 are executed as shown in FIG. 6, and S120 is executed in parallel with S90 to S110 as shown in FIG. 7 in the mask write process. Since the device configuration of the semiconductor memory device 100A of the second embodiment and the other procedures in the mask write process are the same as those of the semiconductor memory device 100 of the first embodiment, the same configuration and the same procedures are denoted by the same reference numerals, and detailed description thereof will be omitted.

As shown in FIG. 5, the semiconductor memory device 100A further includes the buffers BF1 to BF3, a buffer write bus BWB, and a buffer read bus BRB. In the present embodiment, "three" which is the number of buffers BF1 to BF3 corresponds to a number obtained by subtracting one from four" which is the number of cycles required from the start to the end of the mask write process described above. The number of buffers is not limited to three, and four or more buffers may be provided.

The buffers BF1 to BF3 are connected to the ECC code generation unit 22 via the buffer write bus BWB and the buffer read bus BRB. The buffers BF1 to BF3 store buffer data input from the ECC code generation unit 22 via the buffer write bus BWB. The "buffer data" means information indicating the rewritten data, and a write destination bank address and a write destination column address of the rewritten data, which is output from ECC code generation unit 22 when the rewritten data is written to sense amplifier SA. By storing the buffer data in the buffer, the rewritten data related to the latest mask write process can be used in the next mask write process even before the rewritten data is written back to the data recording unit 30 by the mask write process. Details of this effect will be described later.

The buffers BF1 to BF3 output the buffer data to the ECC code generation unit 22 via the buffer read bus BRB.

The buffers BF1 to BF3 store the buffer data until a preset number of clocks elapses after the buffer data is stored, and erase the held buffer data after the elapse. In the present embodiment, the buffers BF1 to BF3 erase the held buffer data after three cycles have elapsed. After three cycles have elapsed since the buffer data was stored, writing back of the rewritten data to the data recording unit 30 by the mask write process is completed. Therefore, when the next mask write process is executed, the rewritten data related to the latest mask write process held in the data recording unit 30 can be used, and it is not necessary to use the data stored in the buffer. Note that "three", which is the preset number of cycles from when buffer data is stored to when the buffer data is erased, corresponds to "three", which is the number of buffers BF1 to BF3.

In the mask write process of the second embodiment shown in FIGS. 6 to 8, as shown in FIG. 6, after S10 is performed, S12 shown in FIG. 8 is performed in parallel with S20, S30, and S40. In S12, the semiconductor memory device 100A determines whether or not there is an address matching buffer (ADR MTCH BUF). The "address matching buffer" means a buffer in which the write destination bank address and the write destination column address held as the buffer data match a write destination address of the target data of the received mask write command among the buffers BF1 to BF3. When there is no address match buffer (S12: NO), the semiconductor memory device 100A sequentially executes the process of S22 and subsequent processes in the first embodiment, and reads the rewriting target data from the data recording unit 30 to the ECC code generation unit 22 as in the first embodiment.

When there is the address match buffer (S12: YES), the semiconductor memory device 100A transmits the rewritten data held in the address match buffer to the ECC code generation unit 22 (S14). Thereafter, in S70 shown in FIG. 7, the semiconductor memory device 100 instructs the ECC code generation unit 22 to newly generate rewritten data using the data read from the address match buffer as the rewriting target data.

After S80 shown in FIG. 7, in parallel with S90 to S110, in S120, the semiconductor memory device 100A writes buffer data in any of the buffers BF1 to BF3. The semiconductor memory device 100A selects, from among the buffers BF1 to BF3, the buffer from which data has been read in S14 described above, and rewrites the buffer data held in the buffer to buffer data including new rewritten data. When the buffer data held in the buffer is erased over time as described above, the buffer data including new rewritten data is newly written to the empty buffer.

Figure 9:
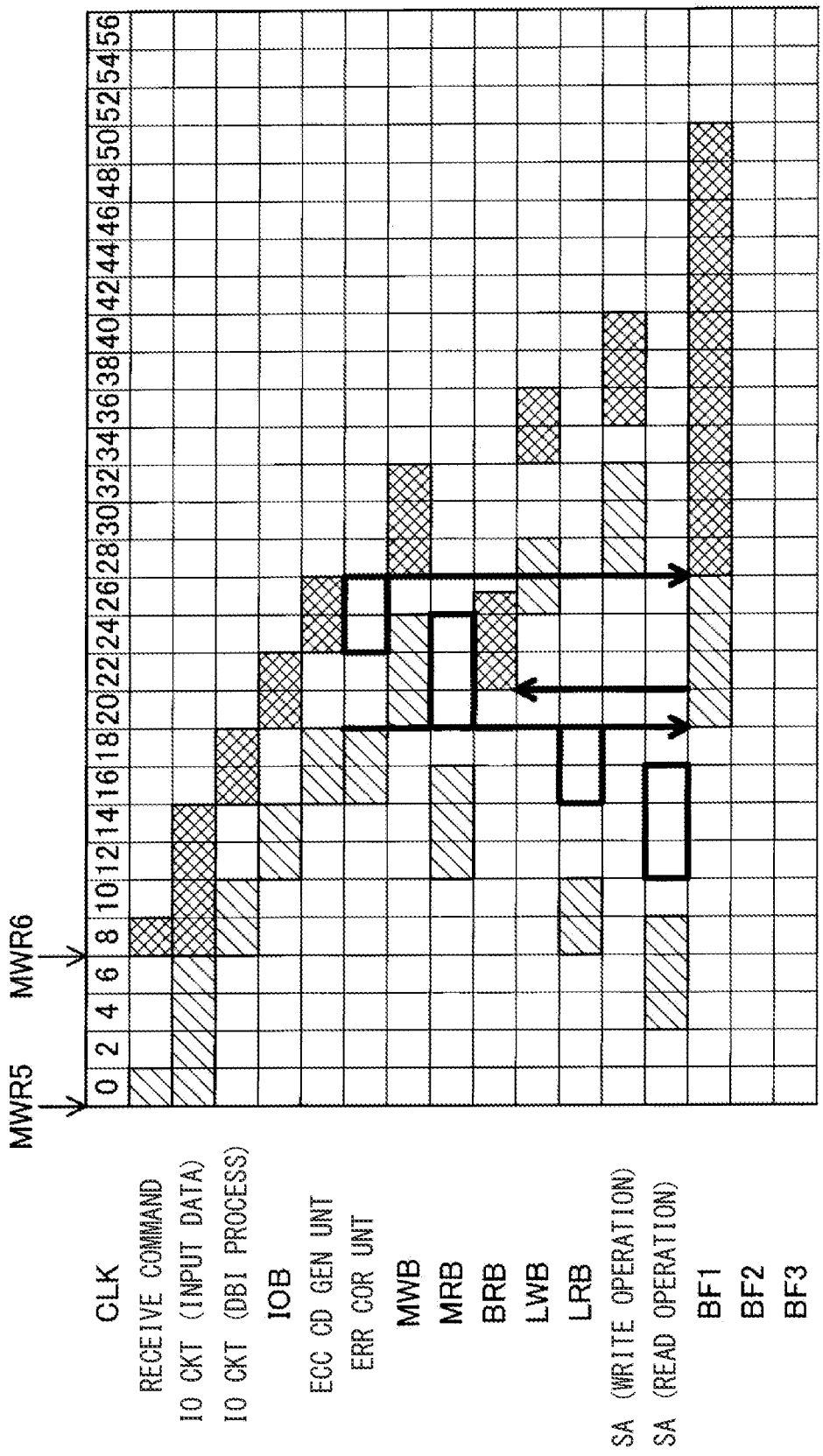
FIG. 9 is a timing diagram showing an example of the operation of the semiconductor memory device according to the second embodiment.

A more specific description will be given with reference to FIG. 9 showing an example of a timing diagram when a plurality of mask write processes is executed in parallel in the semiconductor memory device 100A of the second embodiment. The horizontal axis indicates an elapsed time in terms of the number of clocks CLK, and a rectangular region indicated by hatching or cross-hatching indicates that each element constituting the semiconductor memory device 100A indicated by the vertical axis is used during a clock interval indicated by the rectangular region. The hatched rectangular region indicates that it is used in the mask write process related to a mask write command MWR5, and the cross-hatched rectangular region indicates that it is used in the mask write process related to a mask write command MWR6.

FIG. 9 shows a case where the mask write commands MWR5 and MWR6 are received at the clock numbers CLK0 and CLK8, respectively. The mask write commands MWR5 and MWR6 are commands for requesting the mask write process in which banks and columns to be accessed are the same as each other.

In the mask write process related to the mask write command MWR5, data to be rewritten is read from the storage area ST to the sense amplifier SA in CLK4 to CLK8. Thereafter, the data to be rewritten is transmitted to the ECC code generation unit 22 through transmission via the local read bus LRB, transmission via the main read bus MRB, and error correction in the error correction unit 21. Furthermore, after the process in the ECC code generation unit 22 is completed, the buffer data is output from the ECC code generation unit 22 and is stored in the buffer BF1 at CLK20 in parallel with the output of the rewritten data to the sense amplifier SA. In FIG. 9, a hatched rectangular region indicates that the buffer data stored in the buffer BF1 in CLK20 to CLK26 is buffer data related to the mask write command MWR5.

In the mask write process related to the mask write command MWR6, buffer data related to the mask write command MWR6 having the same access target address as that of the mask write command MWR5 is stored in the buffer BF1. Therefore, the semiconductor memory device 100A omits the read operation in the sense amplifier SA, the transmission via the local read bus LRB, the transmission via the main read bus MRB, and the error correction in the error correction unit 21, which are indicated by a rectangular region surrounded by a thick solid line and not hatched in FIG. 9, and executes the transmission of the rewriting target data from the buffer BF1 to the ECC code generation unit 22 via the buffer read bus BRB at CLK22. As described above, the semiconductor memory device 100A can execute the process in the ECC code generation unit 22 by using the buffer data stored in the buffer BF1 before the rewriting data related to the mask write command MWR5 is completely written back to the data recording unit 30.

After the process in the ECC code generation unit 22 is completed, the semiconductor memory device 100A rewrites the buffer BF1 with new buffer data at CLK28 in parallel with the output of the rewritten data to the sense amplifier SA. In FIG. 9, a cross-hatched rectangular region indicates that the buffer data stored in the buffer BF1 in CLK28 to CLK50 is buffer data related to the mask write command MWR6. The buffer data stored in BF1 is erased at CLK52 after three cycles elapse.

In the mask write process related to the mask write command MWR6, when the read process in the sense amplifier surrounded by the thick solid line is executed at CLK12, the mask write process is executed based on old data before the mask write process related to the mask write command MWR5 is completed, and data inconsistency occurs. Therefore, in the semiconductor memory device having no buffer, when a plurality of mask write processes in which the banks and columns to be accessed are the same as each other are executed, in order to prevent the occurrence of data inconsistency, it is necessary to receive a subsequent mask write command with a delay so that the next mask write process is started after the rewritten data is written back to the data recording unit by the previous mask write process. Therefore, in the semiconductor memory device having such a configuration, the data processing performance at the time of executing the mask write process deteriorates. According to the semiconductor memory device 100A of the present embodiment, since it is possible to avoid such an issue, it is possible to further suppress a decrease in data processing performance at the time of executing a plurality of mask write processes.

According to the semiconductor memory device 100A of the second embodiment described above, since the buffers BF1 to BF3 for storing the buffer data are provided, when the mask write processes in which the banks and the columns to be accessed are the same as each other are continuously executed, the next mask write process can be executed using the buffer data read from any one of the buffers BF1 to BF3 even before the rewritten data is written back to the data recording unit 30 by the previous mask write process. Therefore, even if the banks and the columns to be accessed are the same, the next mask write process can be executed in parallel without waiting for the end of the previous mask write process, and the deterioration in the data processing performance can be further restricted.

Other Embodiments

In the above embodiments, in the semiconductor memory device 100 and the semiconductor memory device 100A, the first bus is formed by the local read bus LRB, the read register RR, and the main read bus MRB, and the second bus is formed by the local write bus LWB, the write register WR, and the main write bus MWB. However, the present disclosure is not limited thereto. The sense amplifier SA and the error correction unit 21 may be directly connected by the main read bus MRB. In this embodiment, the main read bus MRB corresponds to the "first bus" in the present disclosure. The sense amplifier SA and the ECC code generation unit 22 may be directly connected by the main write bus MWB. In this embodiment, the main write bus MWB corresponds to the "second bus" in the present disclosure. The semiconductor memory device having such a configuration also achieves effects similar to those of the above embodiments.

In the first embodiment, the effects of the semiconductor memory device 100 have been described by taking, as an example, the case where the plurality of mask write processes in which the banks to be accessed are the same as each other and the columns to be accessed are different from each other is executed. However, the present disclosure is not limited thereto. Even when the mask write process in which the banks to be accessed in the write process are the same as each other and the columns to be accessed are different from each other is executed subsequently to a write process in which only writing of data is performed, the semiconductor memory device 100 has effects similar to those of the above embodiment. This is because even in such a case, the write operation by the write process and the read operation by the mask write process can be executed in parallel in the sense amplifier SA of the same bank.

In the second embodiment, the effects of the semiconductor memory device 100A have been described by taking, as an example, the case where the plurality of mask write processes in which the banks and columns to be accessed are the same as each other are executed. However, the present disclosure is not limited thereto. Even when the mask write process in which the banks and the columns to be accessed are the same as those in the write process is executed subsequently to the write process in which only writing of data is performed, the semiconductor memory device 100A has effects similar to those of the above-described embodiment. This is because, even in such a case, after the process related to the write process in the ECC code generation unit 22 ends, the buffer data is stored in the buffer, and the mask write process can be executed in parallel using the buffer data before the writing of data by the write process is completed.

In the above-described embodiment, the data recording unit 30 and the ECC code recording unit 40 are implemented by the storage areas ST included in the banks different from each other, but the present disclosure is not limited thereto. The data recording unit 30 and the ECC code recording unit 40 may be implemented by the storage area ST included in the same bank. For example, data of 128 bits and an ECC code of 8 bits corresponding to the data may be held in memory cells designated by the same row address in the memory regions ST included in the same bank and having a data unit of 136 bits or more designated by the row address and read by the sense amplifier SA. The semiconductor memory device having such a configuration also has effects similar to those of the above embodiments. In addition, since the reading and writing of the data and the ECC code corresponding to each other from and to the storage area ST can be realized by one reading and writing in one bank, it is possible to restrict a deterioration in data processing performance as compared with a case in which the data and the ECC code are read and written in different banks.

The present disclosure should not be limited to the embodiments described above, and various other embodiments may be implemented without departing from the scope of the present disclosure. For example, the technical features in each embodiment corresponding to the technical features in the form described in the summary may be used to solve some or all of the above-described issues, or to provide one of the above-described effects. In order to achieve a part or all, replacement or combination can be appropriately performed. Also, if the technical features are not described as essential in the present specification, they can be deleted as appropriate.

What is claimed is:

1. A semiconductor memory device configured to execute a mask write process for rewriting data having a data length smaller than a preset data access unit, comprising:
    a plurality of banks including
        a data recording unit in which rewritten data is to be written, and
        an error check and correct (ECC) code recording unit in which an error correction code corresponding to the rewritten data is to be written;
    a sense amplifier disposed in each of the plurality of banks and configured to read and write data from and to each of the plurality of banks;
    an ECC code generation unit configured to generate the error correction code;
    an error correction unit configured to correct an error of data using the error correction code;
    a first bus connecting the sense amplifier in each of the plurality of banks and the error correction unit and configured to transmit data output from the sense amplifier to the error correction unit; and
    a second bus connecting the ECC code generation unit and the sense amplifier in each of the plurality of banks and configured to transmit data output from the ECC code generation unit to the sense amplifier,
    wherein
    the first bus and the second bus are separately provided so that an output of the data from the sense amplifier to the error correction unit via the first bus and an input of the data from the ECC code generation unit to the sense amplifier via the second bus are executable in parallel in a same bank among the plurality of banks.

2. The semiconductor memory device according to claim 1, further comprising:
    a plurality of buffers configured to store buffer data indicating the rewritten data, a write destination bank address of the rewritten data, and a write destination column address of the rewritten data, wherein
    a number of the plurality of buffers is equal to or greater than a number obtained by subtracting one from a number of cycles required from a start to an end of the mask write process,
    each of the plurality of buffers is configured to erase the buffer data on condition that the number of cycles equal to the number of the plurality of buffers elapses after the buffer data is stored,
    the semiconductor memory device is configured to:
        execute the mask write process by using the rewritten data read from an address matching buffer on condition that there is the address matching buffer among the plurality of buffers, the address matching buffer storing the write destination bank address and the write destination column address that match a write destination address of target data of the mask write process; and
        execute the mask write process using the rewritten data read from the sense amplifier included in one of the plurality of banks indicated by the write destination address on condition that there is no address match buffer.

3. The semiconductor memory device according to claim 1, wherein
    each of the data recording unit and the ECC code recording unit is implemented by a storage area.

4. The semiconductor memory device according to claim 1, wherein
    each of the ECC code generation unit and the error correction unit is implemented by one or more hardware logic circuits.

5. A semiconductor memory device configured to execute a mask write process for rewriting data having a data length smaller than a preset data access unit, comprising:
    a plurality of banks including
        a data recording unit in which rewritten data is to be written, and
        an error check and correct (ECC) code recording unit in which an error correction code corresponding to the rewritten data is to be written;
    a sense amplifier disposed in each of the plurality of banks and configured to read and write data from and to each of the plurality of banks;
    an ECC code generation unit configured to generate the error correction code;
    an error correction unit configured to correct an error of data using the error correction code;
    a first bus connecting the sense amplifier in each of the plurality of banks and the error correction unit and configured to transmit data output from the sense amplifier to the error correction unit;
    a second bus connecting the ECC code generation unit and the sense amplifier in each of the plurality of banks and configured to transmit data output from the ECC code generation unit to the sense amplifier; and
    a plurality of buffers configured to store buffer data indicating the rewritten data, a write destination bank address of the rewritten data, and a write destination column address of the rewritten data, wherein
    a number of the plurality of buffers is equal to or greater than a number obtained by subtracting one from a number of cycles required from a start to an end of the mask write process, each of the plurality of buffers is configured to erase the buffer data on condition that the number of cycles equal to the number of the plurality of buffers elapses after the buffer data is stored, the semiconductor memory device is configured to:

execute the mask write process by using the rewritten data read from an address matching buffer on condition that there is the address matching buffer among the plurality of buffers, the address matching buffer storing the write destination bank address and the write destination column address that match a write destination address of target data of the mask write process; and execute the mask write process using the rewritten data read from the sense amplifier included in one of the plurality of banks indicated by the write destination address on condition that there is no address match buffer.

6. The semiconductor memory device according to claim 1, wherein the first bus and the second bus are separately provided so that when a previous mask write process and a next mask write process are continuously executed in which the same bank and different columns are to be accessed, the next mask write process is executable in parallel without waiting for an end of the previous mask write process.

7. The semiconductor memory device according to claim 1, wherein the first bus and the second bus are separately provided so that the output of the data from the sense amplifier to the error correction unit via the first bus and the input of the data from the ECC code generation unit to the sense amplifier via the second bus are executable in parallel both:

(i) when banks to be accessed from the plurality of banks are different from each other; and (ii) when the banks to be accessed from the plurality of banks are the same and columns to be accessed are different from each other.

* * * * *